United States Patent

[11] 3,589,670

| [72] | Inventor | George W. Armstrong<br>284 E. Dayton Drive, Fairborn, Ohio 45324 |
|---|---|---|
| [21] | Appl. No. | 884,936 |
| [22] | Filed | Dec. 15, 1969 |
| [45] | Patented | June 29, 1971 |

[54] GATE VALVE
9 Claims, 9 Drawing Figs.

[52] U.S. Cl. ........................................... 251/58,
141/317, 222/504, 222/556, 251/301
[51] Int. Cl. ........................................... F16k 31/00,
F16k 1/16
[50] Field of Search .......................... 141/317;
251/58, 298—303; 222/504, 556

[56] References Cited
UNITED STATES PATENTS

| 1,810,772 | 6/1931 | Lassen | 141/317 |
| 2,883,147 | 4/1959 | Mirza et al | 251/301 X |
| 3,091,369 | 5/1963 | Sackett | 222/556 X |
| 3,371,826 | 3/1968 | Speno | 222/504 |

*Primary Examiner*—Henry T. Klinksiek
*Attorney*—Marechal, Biebel, French & Bugg ABSTRACT: A low-profile valve employs a swinging gate type of blade and is particularly adapted for use in installations where the valve height must be maintained to a minimum or where it is desirable to place the valve immediately beneath a hopper, a screw conveyor outlet or the like. The valve body is formed of sections of channel-shaped material in which the upper and lower channel flanges form the valve-mounting flanges and in which the central web of the channels form the valve throat. The curved blade extends through a slot in one of the channels and is supported on a pair of outwardly angulated blade arms. Blade arm supports comprise a pair of correspondingly outwardly angulated support members so that the support members and the arms define a relatively wide clearance space therebetween to receive a hopper or the like.

INVENTOR
GEORGE W. ARMSTRONG

BY
Marechal, Biebel, French & Bugg
ATTORNEYS

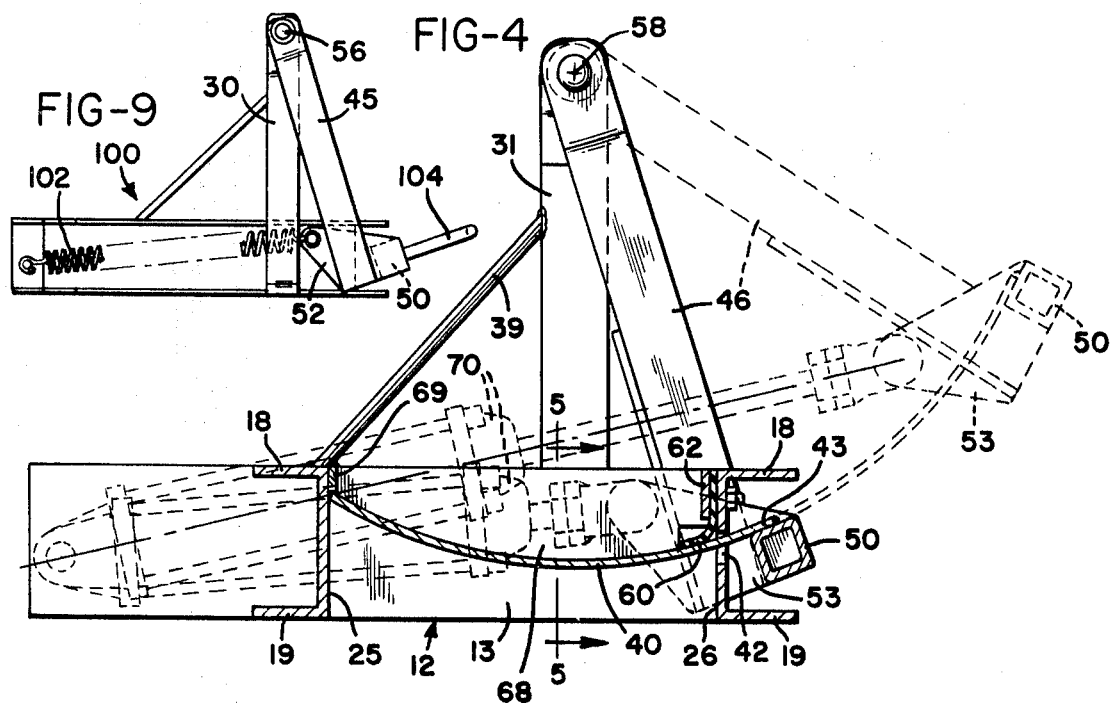
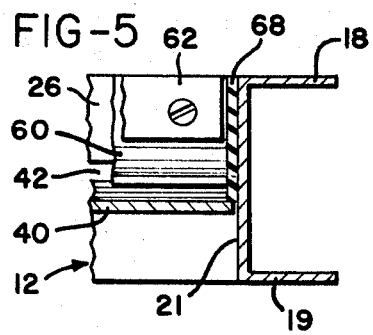
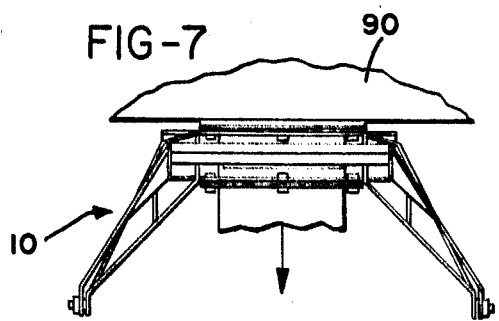
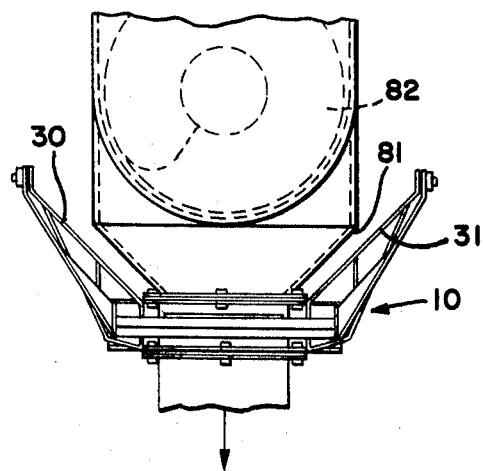
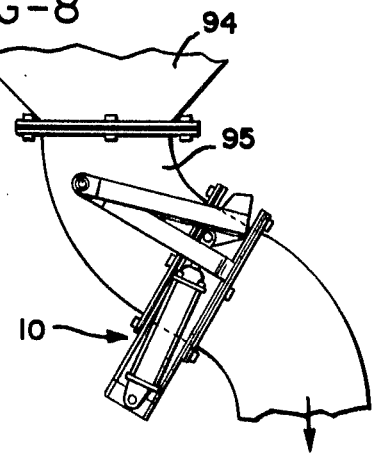

GATE VALVE

BACKGROUND OF THE INVENTION

Swinging gate-type valves in which an arcuate blade moves in flow-controlling relation to a valve body have been successfully employed for controlling the flow of flowable material in conduits, ducts or the like, particularly for controlling a dry, particulate material, and such valves are shown in my U.S. Pats., No. 2,806,489 issued Sept. 17, 1957, and No. 3,380,475 issued Apr. 30, 1968. While the valves of these patents have been successfully used for many applications, there frequently arises a need for a more compact gate-type valve. This is particularly true where only a small amount of headroom is available, or where it is desired to gate directly at the bottom of a hopper or the like. In such cases it has frequently been necessary to employ a sliding type of valve, and while these are satisfactory, special provision must normally be employed to support the valve slide on low-friction guides in order to provide some ease of movement against a head. Further, such valves are usually not inherently self-cleaning so that a quantity of material frequently hangs up around the slide guides and in the low-friction bearings. Even with the use of rollers and the like, these devices frequently require substantial amounts of power to operate and are often complicated and relatively costly. Slide valves also have the disadvantage of requiring a substantial space due to the necessary length of the track slide transversely of the opening. Further, proper tracking of the slide is frequently a problem in such valves.

Clam-type valves have also been used in which a clam gate moves in closing relation to a chute or conduit along the external bottom side of the conduit. Such clam valves are inherently not dusttight, and since the clam gate moves across the bottom opening they do not provide a bottom-attaching flange.

SUMMARY OF THE INVENTION

The present invention is directed to a low-profile or shallow gate-type valve in which a curved blade moves in an arcuate path into flow controlling relationship to a passageway formed in a valve housing. A pair of valve arm support members extend to one side of the valve housing and are angulated outwardly in outrigger fashion so as to receive the throat of a hopper or the body of a screw conveyor therebetween. Thus, the arm supports extend in width to an extent which substantially exceeds the width of the valve body itself. The arcuate blade is mounted on a pair of blade arms which also extend outwardly with their outer ends being pivotally mounted on the arm support members. The lower ends of the blade arms join one end of the blade at a portion which extends outwardly of the housing through blade slot and provide for the arcuate movement of the blade between its open and closed position.

The valve of the present invention is one which may be installed in a wide variety of conditions. Since only a small amount of headroom is required, the valve may be installed in locations where previous curved blade-type valves could not be used. Further, it may be operated in any position. It is particularly designed for use with 45° hoppers, screw conveyors, or the like where the structure immediately above the valve has a width which substantially exceeds that of the throat or the valve body.

Further features of the valve include the fact that the valve blade is easy to remove for the purpose of servicing or replacement since it is mounted on a single pair of external arms at only two bearings. Since the bearings are positioned outside of the valve body they are free of contamination. The blade itself moves exclusively on rolling friction, the only sliding friction being the negligible amount caused by the blade seals.

The blade seals include a wiper seal at the blade slot and self-cleaning side and end seals positioned on the inside walls of the valve body which engage the upper surface of the blade in the closed position. A further feature consists of the preferred construction of the valve housing of channel-shaped sections in which the upper and lower channel flanges form the mounting flanges for the valve, and in which the central web portion of the channel members form the valve walls. This construction provides a high degree of rigidity and ease of attachment.

It is accordingly an important object of the present invention to provide a low-profile swinging gate-type valve in which a curved blade moves in an arcuate path into flow controlling relation to a passageway and in which the blade is mounted for movement on a pair of arms which extend exteriorly to the housing.

Another important object of the invention is the provision of a gate valve of the swinging blade type which is particularly adapted for controlling the flow from hoppers, screw conveyors, and the like and which may be mounted directly to the bottom of such hopper or conveyor and which requires a minimum of head clearance.

Another object of the invention is the provision of a curved blade gate-type valve in which the blade is mounted on bearings which are positioned outside of the valve housing and free of contamination by the material being controlled.

These and other objects and advantages of the invention will become apparent from the following description, the accompanying drawings, and the appended claims.

BRIEF DESCRIPTION OF THE DRAWINGS

FIG. 4 is a vertical section taken generally along the line 4–4 of FIG. 2;

FIG. 5 is a fragmentary detail of the wiper seal and blade taken generally along the line 5–5 of FIG. 4; and FIGS. 6, 7 and 8 show manners in which the valve may be employed with FIG. 6 showing the valve used with a screw conveyor outlet;

FIG. 7 showing the valve inverted on the bottom of a bin or container;

FIG. 8 showing the valve in an elbow conduit, and

FIG. 9 is a side elevation of a hand operated form of the valve.

DESCRIPTION OF PREFERRED EMBODIMENTS

Figure 1:
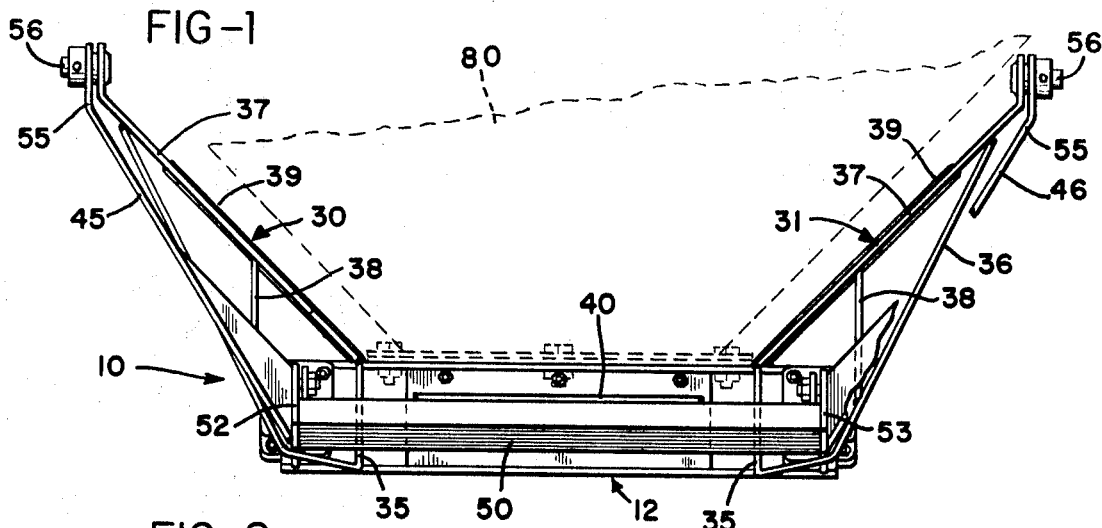
FIG. 1 is an end view of the valve of this invention.
Figure 2:
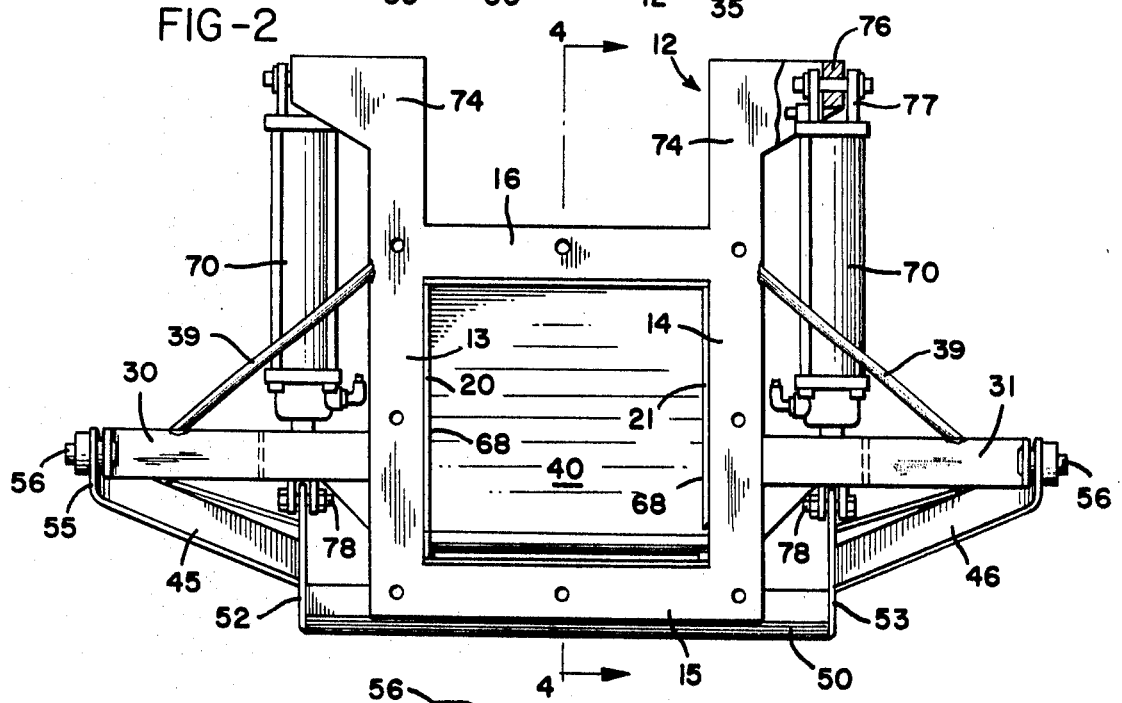
FIG. 2 is a plan view of the valve.
Figure 3:
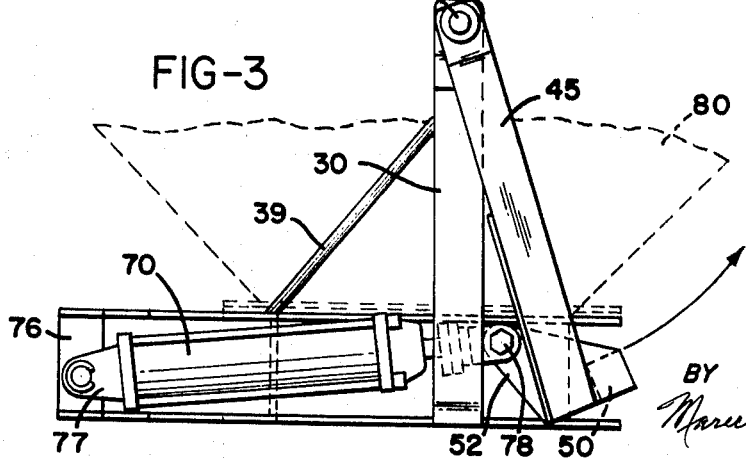
FIG. 3 is a side elevation.

Referring to FIGS. 1—4 a swinging gate low-profile valve is illustrated generally at 10 for controlling the flow of flowable dry particulate material or the like. The valve 10 includes a generally rectangularly arranged valve body or housing 12. The housing 12 is conveniently formed exclusively of channel-shaped members, including a pair of side channels 13 and 14, a front channel 15 and a back channel 16 welded into a boxlike rigid structure. The channel members are each formed with coplanar upper flanges 18, forming one mounting face of the valve, and corresponding bottom flanges 19, also formed in a common plane, forming the bottom-mounting face. The central web portions of the channel members 13, 14, 15 and 16 define the valve walls. Thus, the side channel members 13 and 14 form, respectively, the valve sidewalls 20 and 21 as seen in FIG. 2, while the front channel member 15 forms the front wall 25 (FIG. 4) and the back channel member 16 forms the backwall 26. The valve walls 20, 21, 25 and 26 define the flow passage through the valve.

The valve further includes a pair of upwardly and outwardly angulated valve blade support members 30 and 31. The support members may be formed of strap material with lower ends 35 welded to the side channel members 13 and 14 at the respective flanges 18 and 19. The support members 30 and 31 extend upwardly in outrigger manner above one side of the valve, and preferably are arranged on an included angle of approximately 90° in order to receive a hopper or other structure therebetween, as described below. The members 30 and 31 may have lower brace portions 36 which extend upwardly from the ends 35 and join with an upper portion 37 adjacent the outer ends thereof and may be further provided with intermediate braces 38 to form a rigid boxlike support structure. If desired, rearwardly extending brace rods 39 may be provided to resist longitudinal bending moments.

A curved valve blade 40 (FIG. 4) is formed with a width which corresponds to the spacing of the sidewalls 20 and 21 and which has an effective length which exceeds the spacing between the front and backwalls. The rear wall 26 is formed with a transverse blade slot 42 (FIGS. 4 and 5) through which an outer portion 43 of the blade 40 extends.

The blade 40 is mounted with its concavity facing upwardly toward the terminal ends of the support members 30 and 31, on a pair of blade support arms 45 and 46. For this purpose, the portion 43 of the blade 40 which extends through the slot 42 is fastened to a transverse blade support tube 50. The opposite ends of the tube 50 are secured, as by welding, to plates 52 and 53 (FIG. 2) and the lower ends of the blade support arms 45 and 46 are attached respectively to one of the plates 52 and 53. The cross tube 50 provides tortional rigidity to the blade support.

The arms 45 and 46 are also angled outwardly and have upper ends 55 (FIGS. 1 and 2) pivotally mounted on the remote ends of the support members 30 and 31 by bronze bushings 56. The bushings 56 define a hinge axis indicated at 58 in FIG. 4 which is positioned substantially at the center of curvature of the blade 40 so that the blade moves along a true arc. However, it is within the scope of this invention to so position the axis 58 that a camming action is provided, in the manner taught in my U.S. Pat. No. 3,380,475.

Self-cleaning seal means for sealing the blade 40 with respect to the housing 12 in the closed position of the blade includes a wiper seal 60 (FIGS. 4 and 5) which is mounted on the inside surface of the backwall 26 by a keeper plate 62. The seal 60 may thus be formed of suitable flexible sealing material, such as an elastomer, with its lower edge in overlying and wiping engagement with the upper surface of the blade 40.

Means for sealing the blade at the sidewalls 20 and 21 may comprise a pair of side seal members 68 as best shown in FIG. 2 and 5 which are mounted on the inside surfaces of the sidewalls and which have lower surfaces conforming to the curved upper surface of the blade in its closed position. The plates 68 may be made of soft material such as an elastomer. The front wall 25 may be similarly provided with a seal 69 as shown in FIG. 4 which the nose of the blade contacts in the closed position. It will be noted that the seals 60, 68 and 69, in the open position of the blade 40 are self-cleaning. If the valve is used in an inverted position, as shown in FIG. 7, the seals are reversed so as to operate against the opposite side of the blade 40.

Means for operating the valve may comprise a pair of piston motors 70, as shown in FIGS. 2 and 4. In order to obtain the stroke desired, the side members 13 and 14 may be extended as illustrated at 74 in FIG. 2 and are provided with vertical plates 76 forming a means for attaching the cylinder clevis 77. The rods of the piston are in turn attached by a clevis 78 to the plate 52 and 53. It will be seen from FIG. 4 that the pistons 70 lie adjacent the side channels 13 and 14, and have only a small degree of vertical movement during the opening and closing movement of the valve and are thus in noninterferring relation to the adjacent hopper or bin structure.

As mentioned above, the valve 10 of this invention is particularly adapted for use with wide throats, hoppers and the like, and a typical 45° hopper 80 is illustrated in broken lines in FIG. 1 with the valve 10 being mounted directly to the bottom opening of the hopper. Additional typical arrangements include that illustrated in FIG. 6 in which the valve 10 is mounted to receive material from a tapered bottom throat 81 of a screw conveyor 82. In each of these cases, the hopper 80 and screw conveyor throat 81 have transverse dimensions which substantially exceed the width of the passageway being controlled, and the outwardly extending support members 30 and 31 and the corresponding arms 45 and 46 are arranged to receive the tapered portion of the hopper or the conveyor. It is, however, within the scope of the invention to provide a straight or vertical orientation of the arm support members and the arms where the accommodating of additional width is not required.

Additional illustrations of the use of the value of this invention include the arrangement of FIG. 7 in which the valve 10 is shown as being positioned upside down beneath a bottom opening of an overhead container 90. It will be noted that only a minimum of installation space is required, as defined by the spacing of the flanges 18 and 19 (FIG. 4). In FIG. 8, a hopper 94 is connected to a curved conduit 95 in which the valve 10 is inserted at an oblique angle, again with a minimum of conduit space required.

It will therefore be seen that the valve of the present invention is characterized by a low profile, requiring a minimum of headroom. The blade 40 is pivotally mounted exclusively on the bearings 56 and these bearings are positioned outside of the valve housing and are thus free of contamination. In the event that the blade becomes jammed or bent, or in the event that servicing is required, it is a simple matter to remove the blade by disconnecting the arms 30 and 31 at the bushings and at the clevis pins 78. Similarly, the piston actuators 70 are easily accessible for servicing. The structure is both compact and rigid, and yet employs readily available structural components, resulting in a valve which can be manufactured at a reasonable cost.

FIG. 9 illustrates a slightly modified from of the invention particularly adapted for hand operation. In many installations it is satisfactory to employ a hand-operated valve, such as for batch weighing-out procedures or otherwise where an operator is conveniently close. The valve 100 of FIG. 9 embodies all of the structure and advantages of the valve 10 with the exception that the cylinders 70 have been replaced by coil return springs 102. Also, a convenient handgrip or handle 104 has been attached to the cross tube 50 by means of which an operator may withdraw the blade 40 by pulling the same so that the blade assumes the dotted position substantially as shown in FIG. 4. When released, the springs 102 will return the blade to the closed position, as shown.

While the forms of apparatus herein described constitute preferred embodiments of the invention, it is to be understood that the invention is not limited to these precise forms of apparatus, and that changes may be made therein without departing from the scope of the invention, which is defined in the appended claims.

What I claim is:

1. A low-profile swinging gate valve in which a curved blade moves in an arcuate path into flow controlling relation to a passageway, comprising a valve housing having a pair of sidewalls, a front wall and a backwall and being open at the top and the bottom thereof defining a flow passageway therethrough, a pair of elongated support members each having one end supported on said housing at one of said sidewalls and extending to positions above said passageway, means in said backwall defining a transverse blade slot, an arcuate blade received in said housing through said slot with its concavity facing toward said support member ends, a pair of blade arms having lower ends joined to said blade exteriorly of said housing adjacent said slot and having upper ends pivotally mounted on said support members and providing for said arcuate movement of said blade through said slot into flow controlling relation to said passageway, and operator means connected to said arms for controlling the movement of said blade.

2. The valve of claim 1 in which said support members extend in diverging relation from said housing and in which said blade support arms are similarly angulated outwardly so as to receive therebetween a hopper or the like which has a greater dimension in width than said passageway.

3. The valve of claim 1 further comprising a flexible blade wiping seal member supported on the inside surface of said rear wall and having a depending portion in wiping engagement with the upper surface of said blade.

4. The valve of claim 3 further comprising a pair of sidewall seals received respectively on the inside surfaces of said sidewalls above said blade and having lower sealing surfaces formed with a curvature conforming to that of the upper surface of said blade in the closed position of said blade for engaging said blade upper surface and sealing said blade at said sidewalls.

5. The valve of claim 4 further comprising a blade end seal received on the inside surface of said front wall and having a lower edge portion adapted to be engaged by said blade in the closed position thereof.

6. The valve of claim 1 in which said operator means comprising a pair of cylinders positioned adjacent said sidewalls and connected between said valve housing and said blade arms for effecting said arcuate movement of said blade about said support members.

7. The valve of claim 1 in which said valve-housing walls are defined by channel-shaped members having outwardly extending upper and lower flanges defining respectively peripheral valve-mounting flanges.

8. A swinging gate-type valve for controlling the flow of flowable dry particulate material or the like in which a curved blade moves in an arcuate path into flow controlling relation to a passageway, comprising a valve housing having a pair of sidewalls, a front wall and a backwall forming a flow passageway therethrough, a pair of elongated support members each having one lower end connected to said sidewalls and extending upwardly and outwardly in mutually diverging relation, means in said backwall defining a transverse blade slot, an arcuate blade received in said housing with a portion thereof extending through said blade slot and having a width generally corresponding to the transverse space between said sidewalls and a length which exceeds the length between said front and backwalls so as to be positionable in flow blocking relation to said passageway with a portion thereof extending exteriorly of said housing through said backwall and having its concavity facing upwardly toward said support members, a pair of outwardly angulated blade support arms having lower ends joined to said blade at said exterior portion and having upper ends pivotally mounted adjacent the remote ends of said support members and defining with said support members an included space which substantially exceeds in width the width of said flow passageway, said arms providing for said arcuate movement of said blade through said slot into flow blocking and flow permitting relation to said passageway, and valve operator means having a connection to said blade arms providing for said arcuate blade movement.

9. A swinging gate-type valve for controlling the flow of flowable dry particulate material or the like in which a curved blade moves in an arcuate path into flow controlling relation to a passageway, comprising a valve housing having a pair of side channel members with the flanges thereof extending outwardly and the central web portion thereof defining valve sidewalls, and a front channel member and a corresponding back channel member joined with said side channel members and with the flanges thereof also extending mutually outwardly and the central web portions thereof defining respectively the front and backwall of said valve, said channel members defining a flow passageway therethrough, a pair of angulated elongated support members each having one lower end connected to said side channels at said flanges and extending upwardly and outwardly in mutually diverging relation, means in said backwall defining a transverse blade slot, an arcuate blade received in said housing with a portion thereof extending through said blade slot and having a width generally corresponding to the transverse space between said sidewalls and a length which exceeds the length between said front and backwalls so as to be positionable in flow blocking relation to said passageway with a portion thereof extending exteriorly of said housing through said backwall and having its concavity facing upwardly toward said support members, a pair of outwardly angulated blade support arms having lower ends joined to said blade at said exterior portion and having upper ends pivotally mounted adjacent the remote ends of said support members and defining with said support members therebetween an included space which substantially exceeds in width of said flow passageway, said arms providing for said arcuate movement of said blade through said slot into flow blocking and flow permitting relation to said passageway, and valve operator means having a connection to said blade arms providing for said blade movement.